Aug. 10, 1965 W. W. GOOD 3,199,470

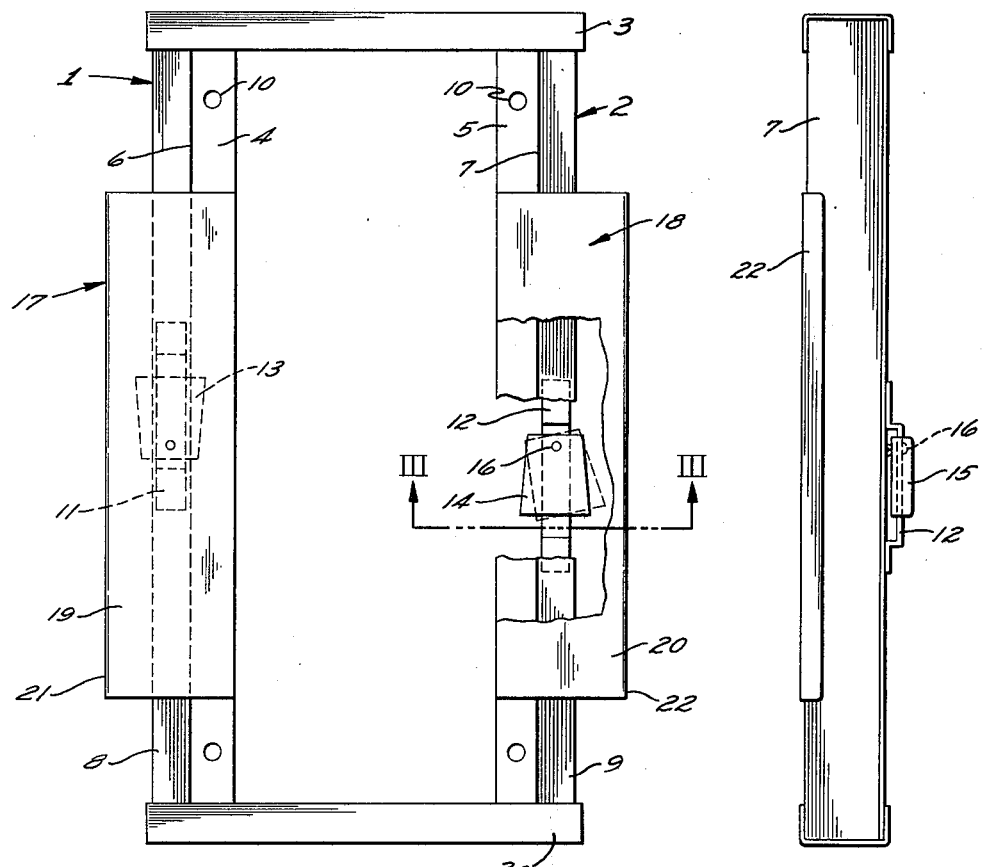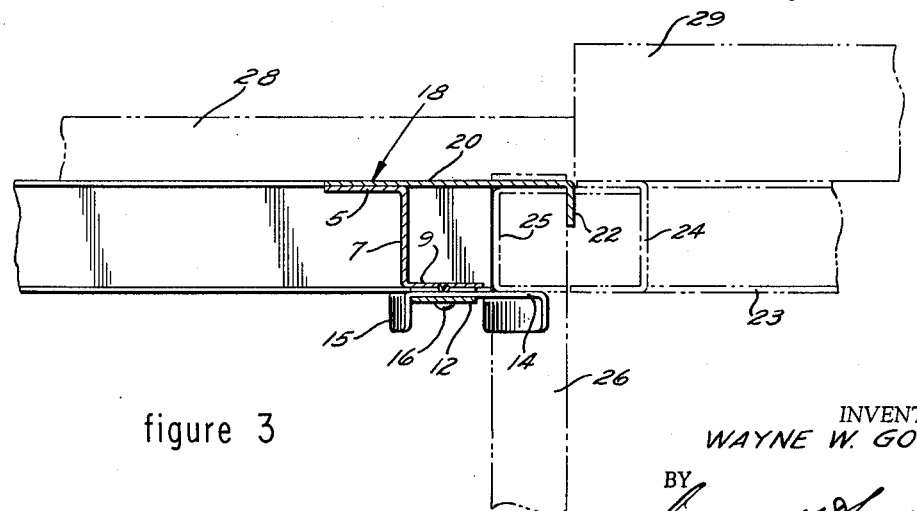

DROP-IN TABLE FOR MODULAR FURNITURE

Filed Aug. 16, 1963 2 Sheets-Sheet 2

INVENTOR.
WAYNE W. GOOD
BY
*Gordon W. Huescher*
ATTORNEY

United States Patent Office 3,199,470
Patented Aug. 10, 1965

3,199,470
DROP-IN TABLE FOR MODULAR FURNITURE
Wayne W. Good, Sturgis, Mich., assignor to Harter Corporation, Sturgis, Mich., a corporation of Michigan
Filed Aug. 16, 1963, Ser. No. 302,687
4 Claims. (Cl. 108—64)

The present invention relates to modular or sectional furniture and is more particularly concerned with a drop-in table for quickly and conveniently joining two units of modular furniture together to form integral assemblies, which remain locked together indefinitely under conditions of normal use but which can be readily disassembled when desired, and with assemblies comprised of units joined by said drop-in table.

Modular furniture has become increasingly popular in recent years. It is extremely versatile and can be readily adapted and re-adapted to meet any decorative situation. Modular furniture in the form of integratable individual units is especially useful for furnishing commercial and professional installations such as reception rooms, waiting rooms, lobbies and lounges. A plurality of units may thus be combined with each other in an almost limitless number of arrangements, as by adding one unit to another. The add-on units are of uniform height and generally comprise free-standing units or both free-standing and non-free-standing units. In any arrangement, at least one free-standing unit is generally required. However, the remaining units may be non-free-standing, having a pair of legs located at only one end. Thus a duplication of legs at each articulation is avoided.

The successful utilization of modular furniture, however, especially for commercial purposes, requires that the units be susceptible to ready joining together in various arrangements without the need for special tools. Moreover, it is necessary that, once joined together, the joint will be sufficiently durable that the units will support normally-encountered stresses and remain joined even under conditions of rather rough use encountered in the commercial installations for which the furniture is designed. Further, the means for connecting the units must be so designed that the units may be readily disassembled when desired and readily reassembled into other patterns and arrangements.

It is an object of the present invention to provide a modular furniture unit in the form of a drop-in table which may be used to join other modular furniture units. It is another object to provide a drop-in table of the type described which is simple to install and which can be quickly attached and locked to the adjoining modular units without the need for tools. It is also an object of the invention to provide an assembly comprised of two or more modular furniture units joined together by such a drop-in table as described. The accomplishment of the foregoing and additional objects will become more fully apparent hereinafter.

The invention in a preferred embodiment is illustrated by the accompanying drawings in which:

FIGURE 1 is a top plan view of a drop-in table frame according to the present invention, partly broken away.

FIGURE 2 is an elevational view of one end of the frame.

FIGURE 3 is a fragmentary cross-sectional view taken at the line III—III of FIGURE 1, and additionally showing in broken lines a table top which may be affixed to the frame, one end of the frame of an adjoining bench unit, and a cushion supported on the bench unit.

Figure 4:
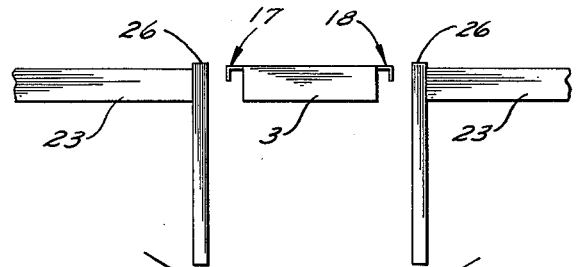
FIGURE 4 is a fragmentary elevational view of the ends of the frames of two adjoining units and the present table unit.

According to the invention, a drop-in table is provided having connecting clips at at least two ends, each clip having a cooperating lock member. The table may be quickly connected to two or more modular furniture units such as benches and locked in place without the use of tools. The assembled structure will remain locked together permanently. When desired, the units may be quickly disassembled and reassembled in any desired arrangement.

As used herein in the specification and claims, the term "supported end" used in reference to a modular furniture unit means an end which has at least two legs to support it. The term "unsupported end" refers to an end which does not have two legs to support it. In general, the modular furniture units of the present invention are of two kinds, one having four legs and being self-supporting, and the other having only two legs, both legs being disposed at one end. In each assembly of units there must be at least one self-supporting unit. The remaining units may be non-self-supporting. For example, the unsupported end of a non-self-supporting unit may be connected to an end of a self-supporting unit. The unsupported end of another non-self-supporting unit may then be connected to the supported end of the non-self-supporting unit, and this process carried out almost ad infinitum. The advantage attained by adding non-self-supporting units is that duplication of legs at the joints is avoided, with resulting simplicity and economy of the overall structure.

Also as used herein, the term "substantially rectangular frame member" refers to an elongate structure whose cross-section has the basic outline of a rectangle. The concept includes tubes of rectangular cross-section, having a continuous perimeter, as well as rectangular channel structures, having a discontinuous perimeter. The important aspect of this requirement of the structure is that it must be capable of being inserted into and engaged by the channels defined by the clips which are affixed to the table frame and the ends of the table frame.

Reference is now made to the accompanying drawings for a better understanding of the invention, wherein all the parts are numbered and wherein the same numbers are used to refer to corresponding parts throughout.

Referring to FIGURES 1 and 2, the frame of the present table structure is shown in detail and comprises a pair of end bars 1 and 2 having a Z-shaped cross-section and affixed as by welding to a pair of side channels 3 and 3a. The end bars 1 and 2 have upper arms 4 and 5 respectively, vertical body members 6 and 7 and lower arms 8 and 9. The upper arms are directed centerward and have openings provided therein for affixing a table top thereto. The lower arms 8 and 9 are directed outwardly. Affixed to the bottom of each lower arm as by spot welding is a lock assembly bracket 11 and 12. Lock members 13 and 14 having depending grip flanges 15 are pivotally mounted on the bracket 11 by drive rivets 16. The lock member 14 is shown in the open position in solid lines and in the closed position in broken lines. Connecting clips 17 and 18 comprised of horizontal body members 19 and 20 and depending flanges 21 and 22 are affixed to the upper arms 4 and 5 as by spot welding.

The present drop-in table is designed to be joined to a plurality of standing units having frame members provided at their ends for being engaged by the clips of the drop-in tables. FIGURE 3 illustrates the manner in which one end of the present drop-in table may be joined to a seat unit. The seat unit frame is comprised of side channels 23, an end channel 24, and a substantially rectangular frame member in the form of an outer channel 25. The end channel and outer channel are so arranged that they are separated by a space in the nature of a slot of sufficient width to receive the depending flange 22 of the table top unit. A pair of legs 26 are affixed to the frame of the seat unit as by, spot-welding.

The depending flange 22 and a portion of the body member 20 of the clip 18 cooperate with an imaginary vertical plane joining the sides of the table frame to define a downwardly opening channel adapted to receive and engage the outer channel 25. The channel 25 is locked in place by pivoting the lock member 14 until it extends beneath the channel. If the table frame is so constructed that the edge of the lower arm 9 is flush with the ends of the side channels 3 and 3a, the imaginary downwardly opening channel will also include the edge of the lower arm 9. However, where, as shown in the drawings, the ends of the side channels 3 and 3a extend a short distance beyond the end bar 2, the channel 25 will only engage the ends of the side channels. The significance of this structural arrangement is that sufficient space must be provided between the depending flange 22 and an imaginary vertical plane representing the outermost part of the table frame to receive the rectangular frame member (channel 25) of the adjoining modular unit.

Figure 5:
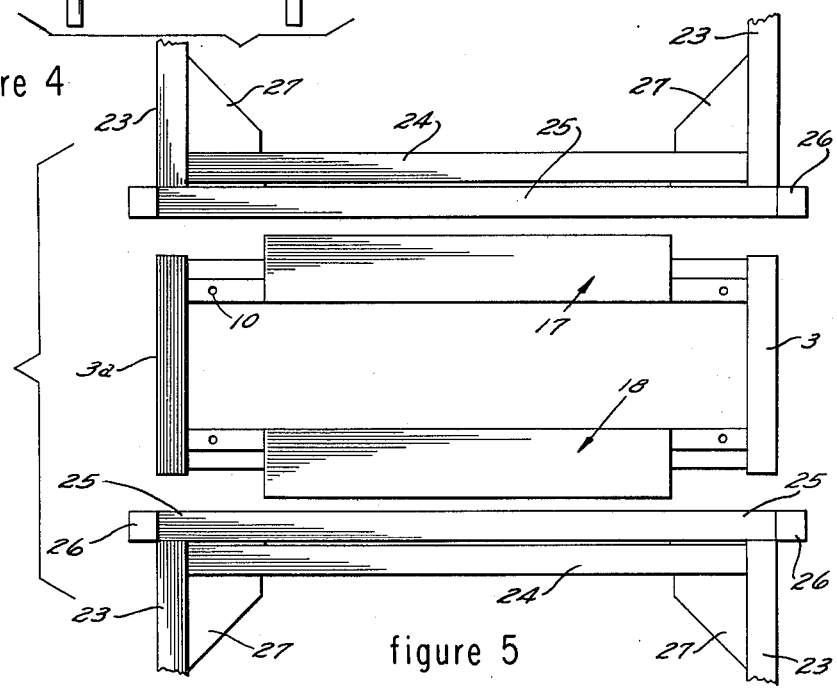
FIGURE 5 is a fragmentary plan view of the ends of two adjoining bench units and the frame of the present table unit preparatory to connecting the drop-in table unit to the bench unit.
Figure 6:
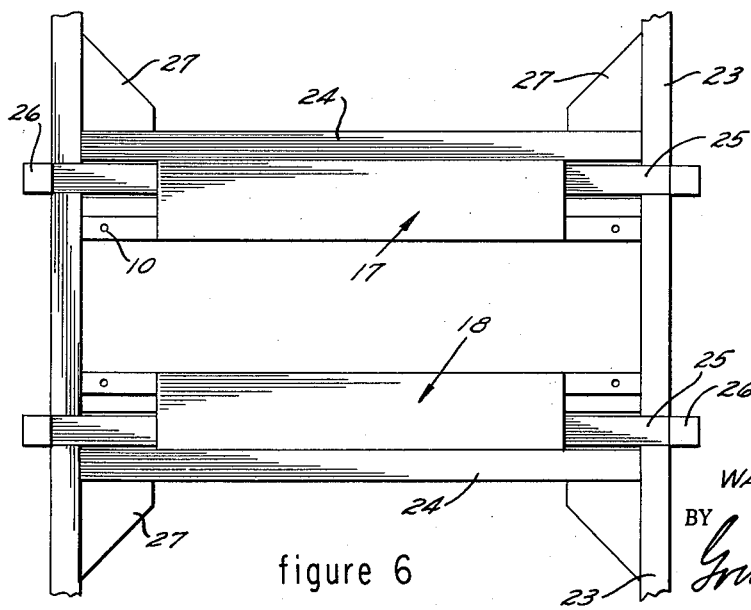
FIGURE 6 is a fragmentary plan view showing the present table unit connected to two adjoining bench units.

FIGURES 4, 5 and 6 illustrate the steps in connecting a drop-in table of the invention with a pair of standing units such as seats. The standing units may be either completely free-standing units, that is, having four or more legs for each section, or may be a supported end of an add-on unit which has its furthermost end attached to another standing unit. FIGURES 4 and 5 illustrate the frame of a drop-in table and the ends of the frames of two seat units. The ends of the frames of the seat units are comprised of legs 26, side channels 23, end channels 24, and outer channels 25. The frames are reinforced by corner gussets 27. The end channels 24 and outer channels 25 are spaced apart a sufficient distance to permit entry of the depending flanges 21 and 22.

The same structure is shown in FIGURE 6 after the depending flanges 21 and 22 have been inserted in the spaces between the end channels 24 and outer channels 25. To complete assembly the lock members 13 and 14 are pivoted into locked position, securing the drop-in table frame to the seat frames. The units remain thus secured over long periods of use.

The drop-in table frame is provided with a table top 28 which may be affixed to the frame by means of screws inserted through suitable openings 10 provided therein. Cushions 29, shown in FIGURE 3, are provided over the seat frames.

The present drop-in table is extremely versatile. It may be used to connect two or more free-standing seats or benches or any other type of modular units together to form a strong, rigid integral articulated assembly. The seat units may be backless, have backs, and even arms.

Although the drop-in table of the present invention has been described and shown in the drawings in the form of a rectangle, it may take any of numerous other forms and contours with equal facility. For example, the table may be made in the form of a wedge. As a result the adjoining seat units when connected are disposed at an angle to each other. By using a plurality of wedge-form drop-in tables, angled or even circular seatings may be provided. When seat units having backs thereon are utilized, the wedge-form drop-in tables may be used to form a circular seating arrangement either with the seats facing the outside of the circle or arc or, alternatively, facing inwardly, or still alternatively, facing alternately both ways. The present tables may be provided with connecting clips on three sides to provide T-form seating assemblies, or even on all four sides of a rectangular, square, or cross-shaped table to provide cross-shaped assemblies. Combinations of the foregoing may obviously be employed. When V-shaped or L-shaped, the unconnected corner may advantageously be fitted with a support means, e.g., a leg.

A plurality of seating and drop-in table units may be combined in any direction or directions from a distance of two feet to infinity. The structures in any case may be readily assembled and locked to form an almost endless variety of different patterns suited for and adaptable to any particular room arrangement.

The frame of the drop-in table is preferably formed of steel or any other suitable metal. It may be advantageously plated with nickel or chromium or subjected to anodization to enhance its appearance and durability, particularly in the regions which are to be exposed in use.

It is to be understood that the invention is not limited to the exact details of construction, operation, or exact materials or embodiments shown and described, as obvious modifications and equivalents will be apparent to one skilled in the art, and the invention is therefore to be limited only by the scope of the appended claims.

I claim:

1. In combination, a plurality of modular furniture units each unit having a supported end terminated by a pair of inner and outer substantially rectangular channel members arranged with their channels in opposing relationship, and a modular drop-in table connected to said units, said modular drop-in table comprising a frame having a table top affixed thereto, a plurality of connecting clips each comprising a horizontal plate affixed at one end to said frame extending outwardly and terminating in a depending flange, the inner and outer channel members of each supported end being substantially parallel and spaced apart to form a slot of sufficient width to enable the depending flange of one of said clips to be received therein, the outer channel member of each modular furniture unit being engaged by one of said clips, and means detachably locking each outer channel member in place.

2. In combination, a plurality of modular furniture units each unit having a supported end terminated by a pair of inner and outer substantially rectangular channel members arranged with their channels in opposing relationship, and a modular drop-in table connected to said units, said modular drop-in table comprising a frame having a table top affixed thereto, a plurality of connecting clips each comprising a horizontal plate affixed at one end to said frame extending outwardly and terminating in a depending flange, the inner and outer channel members of each supported end being substantially parallel and spaced apart to form a slot of sufficient width to enable the depending flange of one of said clips to be received therein, the outer channel member of each modular furniture unit being engaged by one of said clips, and means detachably locking each outer channel member in place comprising a lock member pivotally attached to said frame extended into locking position beneath said channel member, whereby said channel member is detachably secured.

3. In combination, a plurality of modular furniture units each unit having a supported end terminated by a pair of inner and outer substantially rectangular channel members arranged with their channels in opposing relationship, the outer channel member having a pair of legs affixed to the ends thereof, and a modular drop-in table connected to said units, said modular drop-in table comprising a frame having a table top affixed thereto, a plurality of connecting clips each comprising a horizontal plate affixed at one end to said frame extending outwardly and terminating in a depending flange, the inner and outer channel members of each supported end being substantially parallel and spaced apart to form a slot of sufficient width to enable the depending flange of one of said clips to be received therein, the outer channel member of each modular furniture unit being engaged by one of said clips, and means detachably locking each outer channel member in place.

4. In combination, a plurality of modular furniture units each unit having a supported end terminated by a pair of inner and outer substantially rectangular channel members arranged with their channels in opposing relationship, the outer channel member having a pair of legs affixed to the ends thereof, and a modular drop-in table connected to said units, said modular drop-in table comprising a frame having a table top affixed thereto, a plurality of connecting clips each comprising a horizontal plate affixed at one end to said frame extending outwardly and terminating in a depending flange, the inner and outer channel members of each supported end being substantially parallel and spaced apart to form a slot of sufficient width to enable the depending flange of one of said clips to be received therein, the outer channel member of each modular furniture unit being engaged by one of said clips, and means detachably locking each outer channel member in place comprising a lock member pivotally attached to said frame extended into locking position beneath said channel member, whereby said channel member is detachably secured.

References Cited by the Examiner

UNITED STATES PATENTS

| | | | |
|---|---|---|---|
| 1,005,789 | 10/11 | Albrecht | 297—248 |
| 1,022,767 | 4/12 | Beistle | 297—153 |
| 1,050,154 | 1/13 | Martin | 108—114 |
| 1,115,996 | 11/14 | Wilson | 312—195 |
| 1,245,918 | 11/17 | Himmel | 312—111 |
| 1,520,518 | 12/24 | Thomason | 108—64 |
| 1,630,102 | 5/27 | Zimmerman | 108—64 |
| 1,673,384 | 6/28 | Woltz | 108—114 |
| 1,949,326 | 2/34 | Peterson | 312—107 |
| 1,990,046 | 2/35 | Mayrose | 108—114 |
| 2,083,997 | 6/37 | Kahan | 108—114 |
| 2,431,711 | 12/47 | Scott | 312—107 |
| 2,851,311 | 9/58 | Gibbs | 108—64 |
| 2,941,772 | 6/60 | Thayer et al. | 211—148 |
| 3,100,572 | 8/63 | Gingher et al. | 211—148 |

FOREIGN PATENTS

| | | |
|---|---|---|
| 52,041 | 8/36 | Denmark. |
| 98,749 | 4/23 | Switzerland. |

FRANK B. SHERRY, *Primary Examiner.*